(12) United States Patent
Nakanishi et al.

(10) Patent No.: US 6,856,278 B2
(45) Date of Patent: Feb. 15, 2005

(54) RADAR

(75) Inventors: Motoi Nakanishi, Nagaokakyo (JP); Toru Ishii, Hirakata (JP); Tetsu Nishimura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 58 days.

(21) Appl. No.: 10/334,898

(22) Filed: Jan. 2, 2003

(65) Prior Publication Data

US 2003/0128154 A1 Jul. 10, 2003

(30) Foreign Application Priority Data

Jan. 7, 2002 (JP) ........................................ 2002-000775

(51) Int. Cl.[7] ........................... G01S 13/32; G01S 13/93
(52) U.S. Cl. ........................ 342/128; 342/70; 342/118; 342/147; 342/158; 342/189; 342/192; 342/195
(58) Field of Search ............................. 342/70, 71, 72, 342/104–116, 118, 128–133, 147–158, 175, 192, 193–197, 189

(56) References Cited

U.S. PATENT DOCUMENTS

| | | | | |
|---|---|---|---|---|
| 5,122,803 A | * | 6/1992 | Stann et al. | ................. 342/196 |
| 5,619,208 A | * | 4/1997 | Tamatsu et al. | ............... 342/70 |
| 5,731,778 A | * | 3/1998 | Nakatani et al. | ............... 342/70 |
| 5,940,024 A | * | 8/1999 | Takagi et al. | .................. 342/70 |
| 5,945,939 A | * | 8/1999 | Iihoshi | ......................... 342/70 |
| 6,072,422 A | * | 6/2000 | Yamada | ....................... 342/70 |
| 6,140,954 A | * | 10/2000 | Sugawara et al. | ............ 342/70 |
| 6,320,531 B1 | * | 11/2001 | Tamatsu | ..................... 342/109 |

FOREIGN PATENT DOCUMENTS

| | | |
|---|---|---|
| EP | 0 773 452 A | 5/1997 |
| EP | 0 981 059 A | 2/2000 |
| EP | 1 319 961 A | 6/2003 |
| JP | 04-343084 | 11/1992 |
| JP | 2000-065921 | 3/2000 |

* cited by examiner

Primary Examiner—Bernarr E. Gregory
(74) Attorney, Agent, or Firm—Keating & Bennett, LLP

(57) ABSTRACT

A radar performs accurate and appropriate pairing even if peaks of approximately identical signal intensities or even if a plurality of peak groups having identical representative beam bearings exist in the frequency spectrum. First, the peak frequency of a peak which appears in the frequency spectrum is determined for each of an up-modulating interval and a down-modulating interval in predetermined beam bearings, and signal-intensity profiles in the beam bearings are extracted with regard to a plurality of beam portions which are adjacent to the beam bearings. Next, the correlation level between the signal-intensity profiles at the up-modulating interval and the down-modulating interval is determined, and pairing is performed in sequence starting from the profiles having a higher correlation level.

19 Claims, 13 Drawing Sheets

RADAR

BACKGROUND OF THE INVENTION

1. Field of the Invention

The present invention relates to a radar that detects a target by transmitting and receiving radio waves generated by performing frequency modulation of continuous waves.

2. Description of the Related Art

An FM-CW radar that detects a target by transmitting and receiving radio waves generated by performing frequency modulation (FM) of continuous waves (CW) transmits a transmitting signal such that an up-modulating interval in which the frequency gradually increases and a down-modulating interval in which the frequency gradually decreases change repeatedly with respect to time in the form of a triangular wave, and receives a reception signal including reflected signals from the target, whereby a relative distance to the target and its relative speed are determined based on the frequency spectrum of a beat signal representing a frequency difference between the transmitting signal and the reception signal. Also, by performing the above-described operation for one beam directed to a predetermined bearing, and by sequentially changing the beam bearing, detection of targets in a predetermined bearing-angle range is performed.

When there is a single target, at the up-modulating interval and the down-modulating interval, a peak appears in the frequency spectrum of a beat signal based on reflected waves from the target. Thus, based on the frequency (hereinafter referred to as the "upbeat frequency") of the beat signal at the up-modulating interval and the frequency (hereinafter referred to as the "downbeat frequency") of the beat signal in the down-modulating interval, a relative distance to the target and its relative speed are determined.

However, when there is a plurality of targets in a scanning range, for a single beam, many peaks appear in the frequency spectrum at both the up-modulating interval and the down-modulating interval. For this reason, there is a risk in that an error may occur in combining (hereinafter referred to as "pairing") a plurality of upbeat frequencies and a plurality of downbeat frequencies.

In radar (1), described in Japanese Patent No. 2765767 (Japanese Patent Application No. 03-114621), a radar is disclosed in which peaks in frequency spectrums having substantially identical signal intensities are selected as the peaks resulting from the same target. Furthermore, in radar (2) described in Japanese Unexamined Patent Application Publication No. 2000-65921, a radar is disclosed in which peaks which appear in the frequency spectrums at an up-modulating interval and peaks which appear in the frequency spectrum at a down-modulating interval are paired by those peaks having identical representative beam bearings.

However, in the above-described radar (1), when there is a plurality of peaks of substantially identical signal intensities in the frequency spectrums, pairing is not adequately performed. Furthermore, in the above-described radar (2), when there is a plurality of peak groups having identical representative beam bearings, pairing is not adequately performed.

SUMMARY OF THE INVENTION

To overcome the above-described problems, preferred embodiments of the present invention provide a radar which performs outstanding pairing even when peaks of approximately identical signal intensities and/or even when a plurality of peak groups having identical representative beam bearings exist in the frequency spectrums.

A preferred embodiment of the present invention provides a radar including a pairing unit which determines the peak frequency of a peak in the frequency spectrum with regard to each of the up-modulating interval and the down-modulating interval in a predetermined beam bearing, which defines a signal-intensity profile at a frequency that is equal to the peak frequency with regard to a plurality of beams which are adjacent to the predetermined beam bearing, which determines a correlation level between a profile at the up-modulating interval and a profile at the down-modulating interval, and which selects a combination having the highest correlation level. Therefore, even when peaks of approximately identical signal intensities and/or even when a plurality of peak groups having identical representative beam bearings exist in the frequency spectrums, appropriate pairing is performed.

As described above, with respect to a plurality of beams which are adjacent to a predetermined beam bearing, signal-intensity profiles at a frequency that is equal to the peak frequency of a peak in a frequency spectrum are used as original data for pairing. That is, the correlation level between the signal-intensity profile at the up-modulating interval and the signal-intensity profile at the down-modulating interval is determined, and the combination having the highest correlation level is determined to be that which results from reflected waves from the same target. As a result, the occurrence of mis-pairing is minimized and greatly reduced.

The radar according to this preferred embodiment of the present invention preferably further includes a unit for extracting, as a peak group, a portion in which the peaks are consecutive in the beam bearings, wherein the signal-intensity profile of the peak group is extracted. By performing pairing by using one signal-intensity profile with respect to one peak group in this manner, the amount of data to be handled and the number of computation or calculation processes are greatly reduced. As a result, detection of many targets is possible even by using a computation or calculation processing section having limited computation or calculation processing power.

In preferred embodiments of the present invention, the number of items of data of the signal intensities of the peaks in the beam bearings, for which the correlation level is to be calculated, is approximately equal to the number of beams or the number of scan intervals covered by a single beam width. For example, if a beam width in the beam bearings is N times as broad as one scan interval, and if a target is a tiny-dot, reflected waves occur in N beams when beam scanning is performed. That is, in the frequency spectrums, peaks occur for N consecutive beams in the beam bearings. Therefore, by determining the correlation level based on N items of signal-intensity data, the pairing accuracy is improved for even a small target by increasing the correlation level of the signal-intensity profiles resulting from the same target.

In preferred embodiments of the present invention, the number of items of data of the signal intensities of the peaks in the beam bearings, for which the correlation level is to be calculated, is decreased as the distance to the object increases. Since the number of peaks which are consecutive in the beam bearings is decreased as the distance to the object increases, by correspondingly adjusting the number of items of data for which a correlation level is to be calculated, the correlation level of the signal-intensity profiles resulting from reflected waves from the same target is further improved regardless of the distance to the target, and the pairing accuracy is greatly improved.

In preferred embodiments of the present invention, the correlation level is preferably a normalized correlation coefficient. As a result, the degrees of correlation level are defined by indexes, and pairing is facilitated.

In preferred embodiments of the present invention, when, near the end of the scanning range, the number of items of data of the signal intensities of the peaks in the beam bearings does not reach a number required to determine the correlation level, the correlation level is determined by ignoring insufficient data. As a result, pairing using the correlation level is performed even near the end of the scanning range.

In preferred embodiments of the present invention, when, near the end of the beam scanning range, the number of items of data of the signal intensities of the peaks in the beam bearings does not reach a number required to determine the correlation level, the correlation level is determined by supplementing the insufficient data with predetermined data. For example, the insufficient data is supplemented with signal-intensity data within the scanning range or is supplemented with data of a fixed value. As a result, the correlation level is calculated by the same calculation method with the number of items of data required to calculate the correlation level being fixed.

Other features, elements, characteristics and advantages of the present invention will become more apparent from the following detailed description of preferred embodiments thereof with reference to the attached drawings.

DETAILED DESCRIPTION OF PREFERRED EMBODIMENTS

The configuration of a radar according to preferred embodiments of the present invention will now be described with reference to the drawings.

Figure 1:
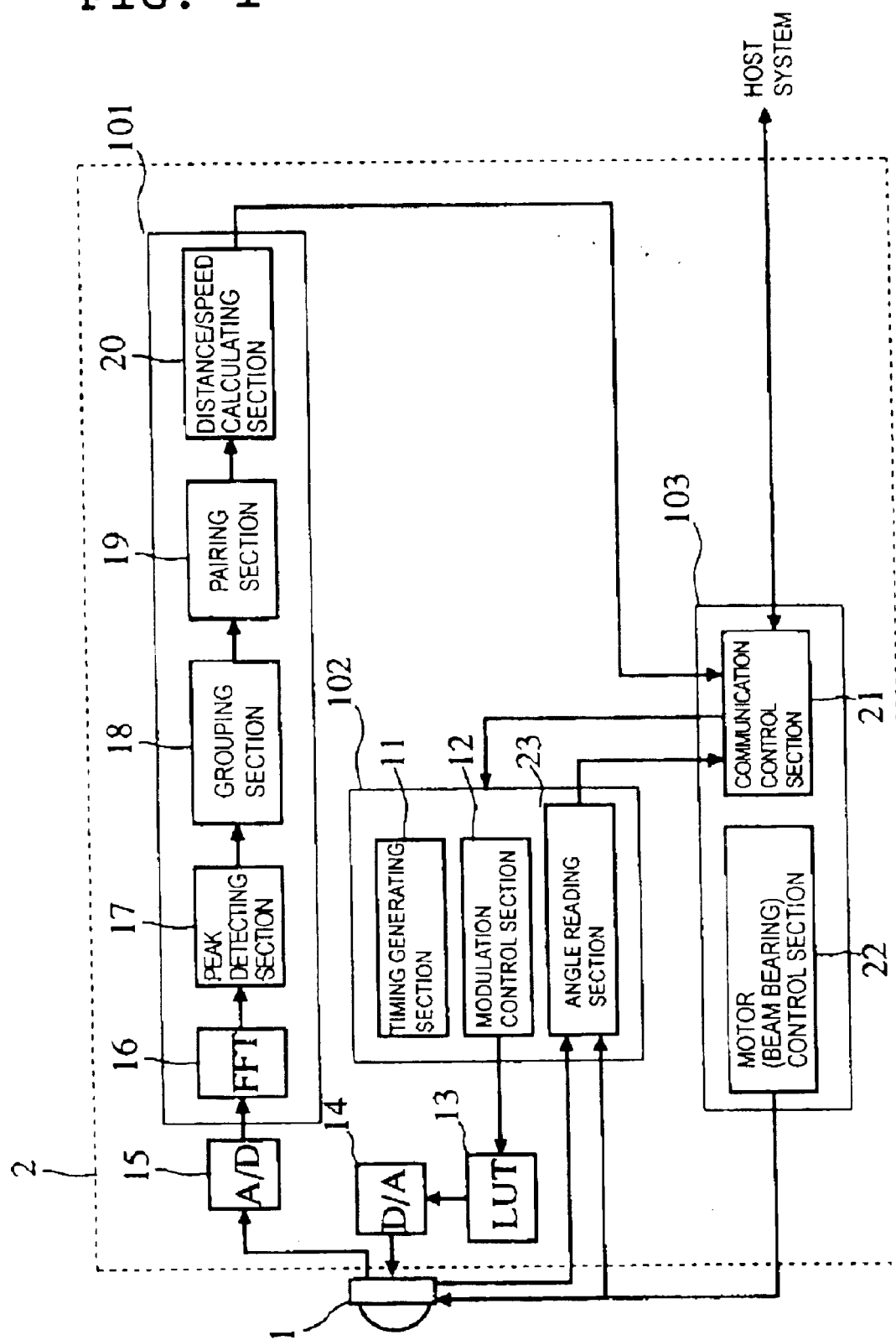
FIG. 1 is a block diagram showing the configuration of a radar according to a preferred embodiment of the present invention.

FIG. 1 is a block diagram showing the configuration of a radar. In FIG. 1, reference numeral 1 denotes a front end of the radar that transmits and receives millimetric-wave signals, and reference numeral 2 denotes a radar control section connected to the front end 1. In the radar control section 2, the portion indicated by reference numeral 101 is a signal processing section for processing a beat signal, and the portion indicated by reference numeral 102 is a control section that modulates a transmitting signal and detects a beam bearing, and reference numeral 103 denotes a section for performing beam scanning and communication control. A timing generating section 11 generates a timing signal for modulating a transmitting signal. In synchronization with the timing signal, a modulation control section 12 outputs, to an LUT 13, control data (values) for transmitting a millimetric-wave signal at the transmitting frequency required at each point in time. The LUT 13 is a look-up table, and the relationships of the input values to the output values are determined in advance and stored in a table form. A DA converter 14 supplies the front end 1 with an analog voltage signal in accordance with a value output from the look-up table 13. The front end 1 includes a voltage-controlled oscillator (VCO), whereby a voltage output from the DA converter 14 is input as a control voltage for the VCO, and a millimetric-wave signal having a frequency corresponding to the voltage is transmitted.

The front end 1 includes a mixing circuit that outputs a beat signal generated by mixing a local signal extracted by being coupled to the transmitting signal with a reception signal. An AD converter 15 samples the beat signal at a predetermined sampling period and converts the beat signal into a digital data sequence. The signal processing section 101 is formed by a digital signal processing section (DSP), and the signal processing inside the signal processing section 101 is performed by program processing such as summation calculation.

In an FFT processing section 16, the predetermined number of items of input sampled data is subjected to a high-speed Fourier transform, and discrete frequency analysis is performed thereon to determine a power spectrum.

A peak detecting section 17 detects the peak frequency of a peak of a signal intensity appearing in the frequency spectrum and the signal intensity of the peak frequency. A grouping section 18 extracts, as a peak group, a group in which peaks appearing in the frequency spectrum are consecutive in the beam bearings.

A pairing section 19 checks pairs of a plurality of peak groups at an up-modulating interval and a plurality of peak groups at a down-modulating interval, and determines a combination of peak groups caused by the same target.

A distance/speed calculating section 20 calculates, for the paired peak group, a relative distance to the target producing the peak groups and its relative speed based on a peak frequency at the up-modulating interval and a peak frequency at the down-modulating interval.

A motor (beam bearing) control section 22 supplies the front end 1 with beam-bearing control data. The front end 1 includes a motor for changing a beam bearing, and directs a beam in a bearing designated based on the control data from the motor (beam bearing) control section 22. Also, the front end 1 includes a unit for outputting a signal for detecting the beam bearing, and an angle reading section 23 determines the current beam bearing by reading the signal.

A communication control section 21 outputs, to a host system (host apparatus), data of the beam bearing and data of a relative distance to each target and its relative speed in that beam bearing. The communication control section 21 receives control data from the host system and supplies the data to a modulation/beam-bearing detecting and controlling section 102. For example, the setting of a changing speed of the beam bearing, the setting of repetition speed of the up-modulating interval and the down-modulating interval, and other data, are performed.

Figure 2:
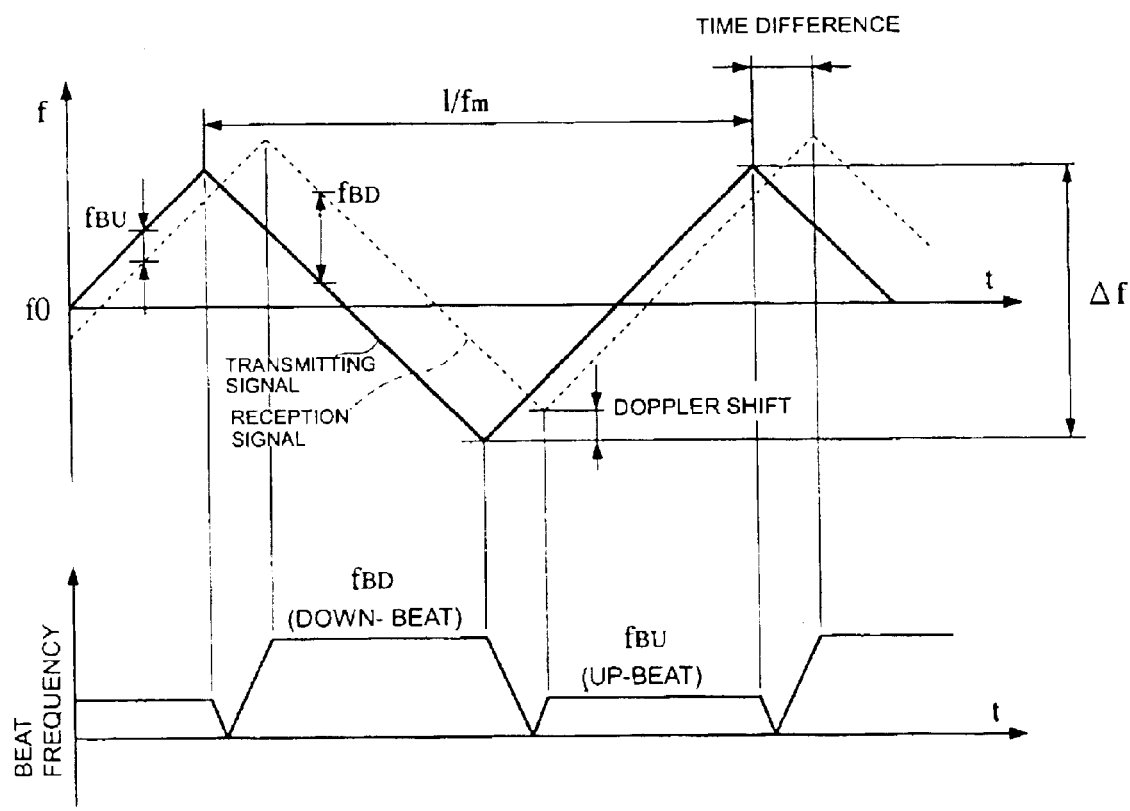
FIG. 2 shows examples of changes in the frequency of a transmitting signal and a reception signal which are changed in accordance with a relative distance to a target and a relative speed to the target.

FIG. 2 shows an example of a shift, caused by the distance to a target and its relative speed, of a frequency change in a transmitting signal and a reception signal. A frequency difference between the transmitting signal and the reception signal when the frequency of the transmitting signal increases is an upbeat frequency $f_{BU}$, and a frequency difference between the transmitting signal and the reception signal when the frequency of the transmitting signal decreases is a downbeat frequency $f_{BD}$. A shift (time difference) in the time axis between the transmitting signal and the reception signal corresponds to the round-trip time of radio waves between an antenna and the target. A shift in the frequency axis between the transmitting signal and the reception signal is a Doppler shift, and is caused by the relative speed of the target to the antenna. The time difference and the Doppler shift change the values of the upbeat frequency $f_{BU}$ and the downbeat frequency $f_{BD}$. In other words, by detecting the upbeat and the downbeat frequencies, the distance from the radar to the target and the relative speed of the target to the radar are calculated.

Figure 3:
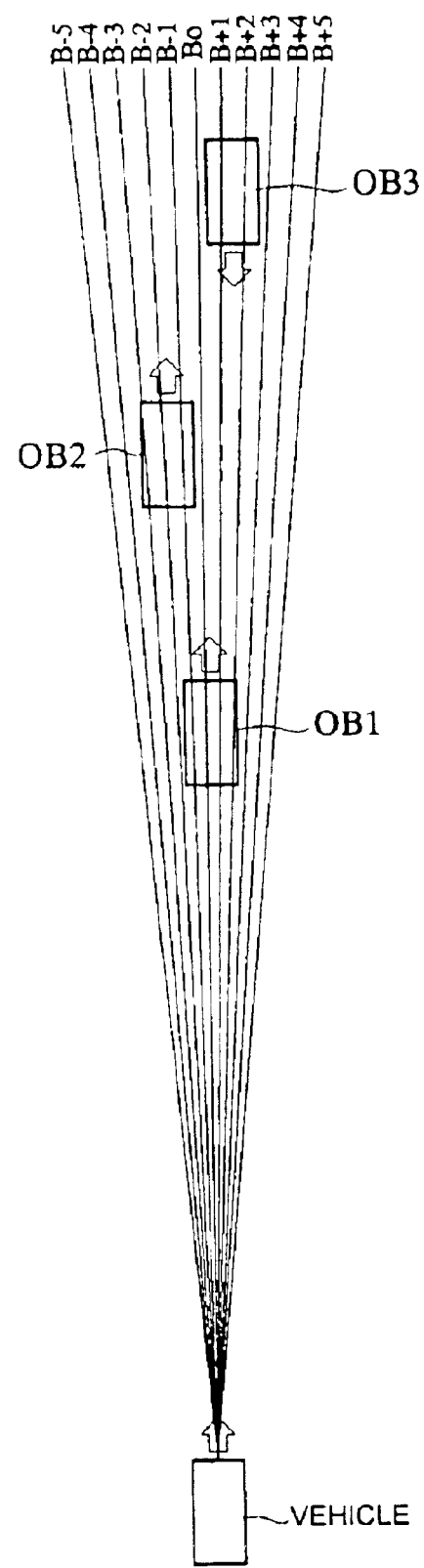
FIG. 3 is an illustration of the relationship between beams and targets in a scanning range.

FIG. 3 shows an example of the relationship between the bearings of the radar's transmitting and received beams and a plurality of targets. Here, Bo denotes the front direction of the radar when it is installed in a vehicle. B+1, B+2, . . . denote beam bearings extracted when the beam bearing is changed from the front to the right. Similarly, B−1, B−2, . . . denote beam bearings extracted when the beam bearing is changed from the front to the left.

In FIG. 3, the rectangularly represented targets OB1 to OB3 indicate other vehicles existing ahead of the vehicle. The arrows indicate their traveling directions.

Figure 4A:
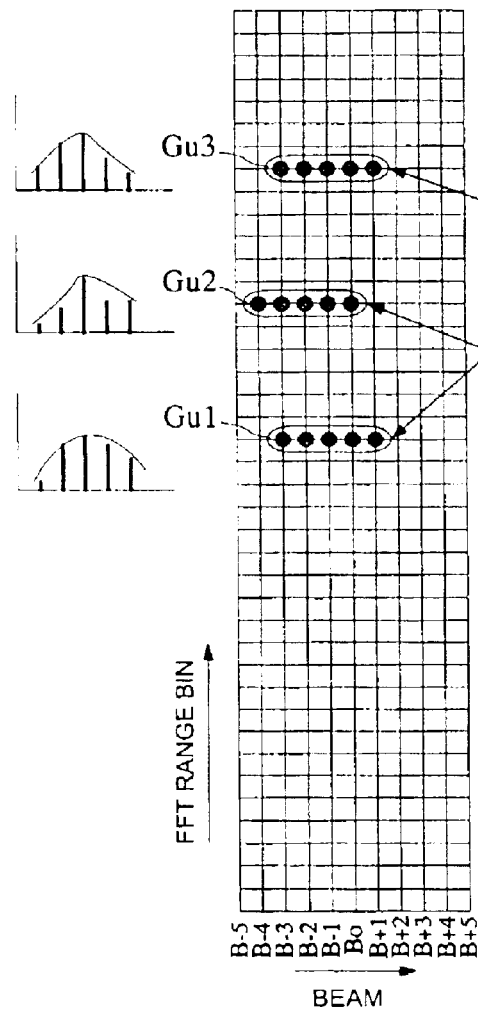
FIGS. 4A, 4B, and 4C show examples of a peak frequency spectrum for each beam bearing at an up-modulating interval and a down-modulating interval.
Figure 4B:
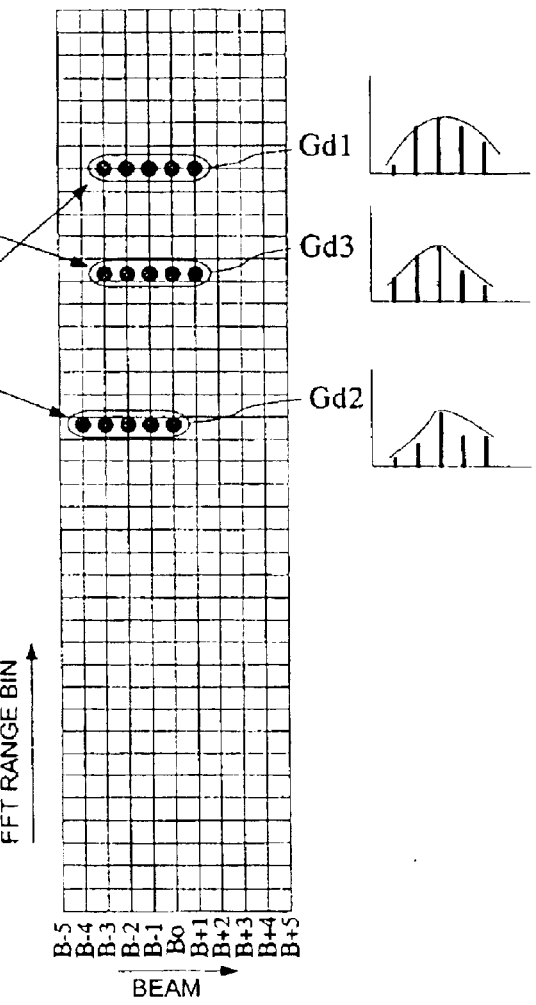
Figure 4C:
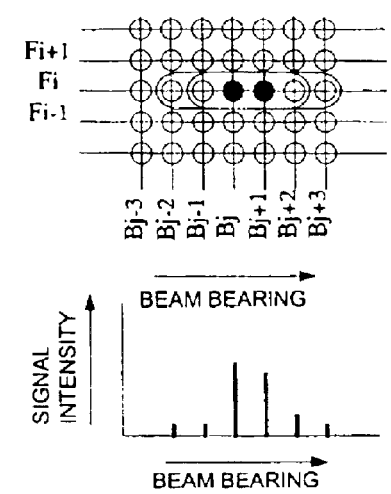

FIGS. 4A, 4B, and 4C show peak frequencies of the peaks which exist in the frequency spectrum for each beam having a bearing that is different with respect to the up-modulating interval and the down-modulating interval. The peak frequencies are shown by the rectangular coordinates such that the horizontal axis indicates the beam bearing, and the vertical axis indicates the peak frequencies of the peaks included in the frequency spectrum. In FIGS. 4A and 4B, reference numerals Gu1, Gu2, and Gu3 denote peak groups in which peaks in the frequency spectrum at the up-modulating interval, resulting from three targets, are consecutive in the beam bearings. Reference numerals Gd1, Gd2, and Gd3 denote peak groups in which peaks in the frequency spectrum at the down-modulating interval, resulting from three targets, are consecutive in the beam bearings.

As described above, a signal-intensity profile is extracted for a plurality of beams which are adjacent in the predetermined beam bearing. For example, in FIG. 4C, when, with respect to a beam bearing Bj and a frequency Fi, a signal-intensity profile (hereinafter referred to simply as a "profile") is to be determined for five beams, the signal intensity of the same frequency Fi is determined with respect to five beams of the beam bearings Bj−2 to Bj+2 with that beam bearing Bj being the center. Furthermore, for example, when a signal-intensity profile is to be extracted with respect to the beam bearing Bj+1 and the frequency Fi, a data sequence of the signal intensities of the frequency Fi is extracted as a profile with respect to the beam bearings Bj−1 to Bj+3 with that beam bearing Bj+1 being the center.

In the manner described above, a profile is extracted with respect to each point of the peak which appears in the frequency spectrum. Then, correlation levels are determined for all of the combinations of the profiles determined for the up-modulating interval and for the down-modulating interval, and the combination having the highest correlation level is selected. In FIGS. 4A and 4B, the profile of each peak group is also shown. The combination having the highest correlation level between these profiles is determined to be the profiles resulting from the reflected waves from the same target.

In the above-described profile determination, a profile is determined for each of the peak frequencies of all the peaks. However, when the beam width of one beam is wider than the spacing between adjacent beams by beam scanning, even with a single target, peaks resulting from the reflected waves thereof appear for a plurality of beams in the beam bearings, as shown in FIGS. 4A and 4B.

Accordingly, if a peak group in which the peaks which appear in the frequency spectrum are consecutive in the beam bearings is extracted, and if the profile of that peak group is determined, the total number of profiles to be determined is greatly reduced, and thus, the time required to extract a profile and the number of computation processes for determining the correlation level is greatly reduced.

Figure 5A:
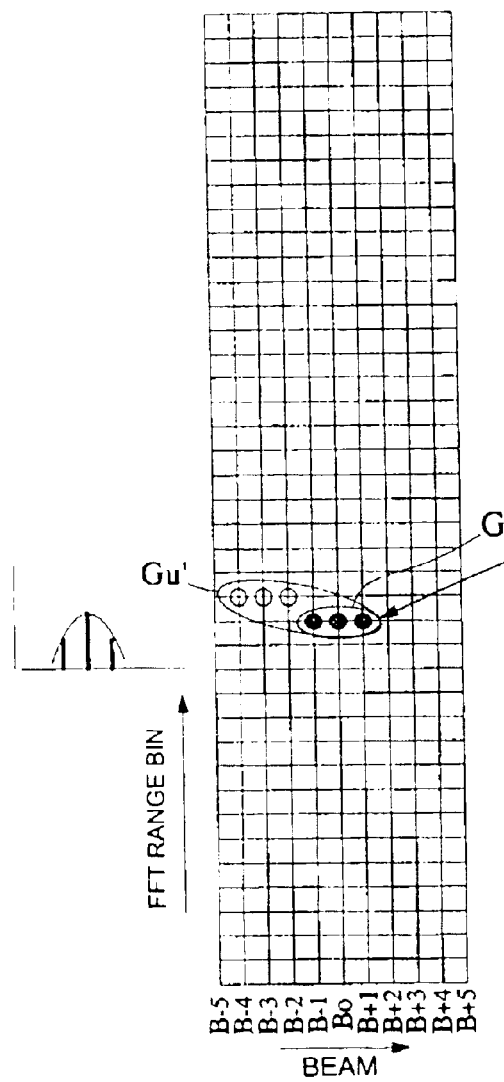
FIGS. 5A and 5B show a grouping method.
Figure 5B:
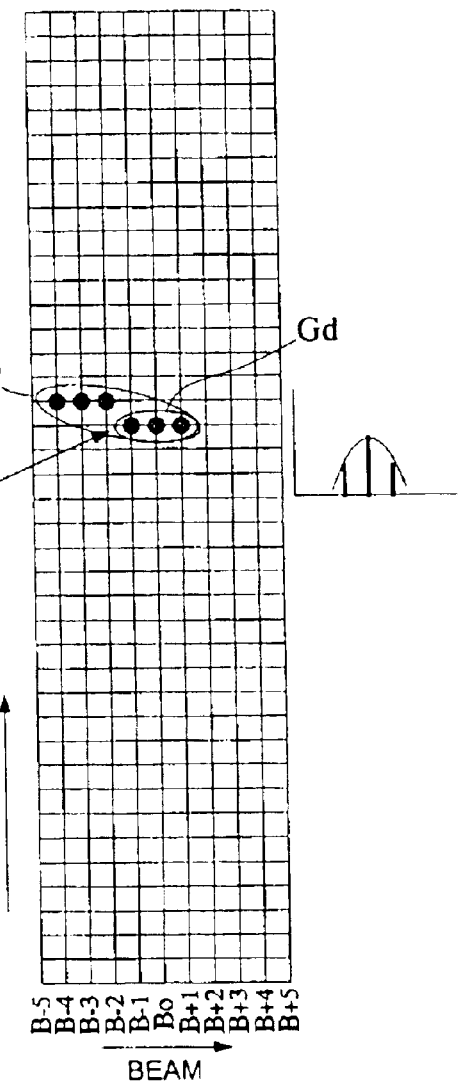

FIGS. 5A and 5B show an example of determining the above-described peak group. Gu' denotes a peak group at the up-modulating interval, which results from one target and which spreads in the beam bearings and in the frequency direction. Gd' denotes a peak group at the down-modulating interval. When the relative speed of the movable body is high, the peak frequency shifts during the beam scanning. However, in this preferred embodiment, since peaks which are consecutive in the beam bearings at the same frequency are grouped, these peaks are grouped so as to surround Gu at the up-modulating interval and to surround Gd at the down-modulating interval.

Thereafter, a profile is extracted for a predetermined number of beams including the group. Therefore, in the example shown in FIGS. 5A and 5B, Gu' and Gd' are considered as two peak groups in which the frequency differs by one range bin. However, since the relative distance and the relative speed are correctly determined for each of Gu' and Gd', no problems occur as long as the identification of a single target is not required.

Figure 6A:
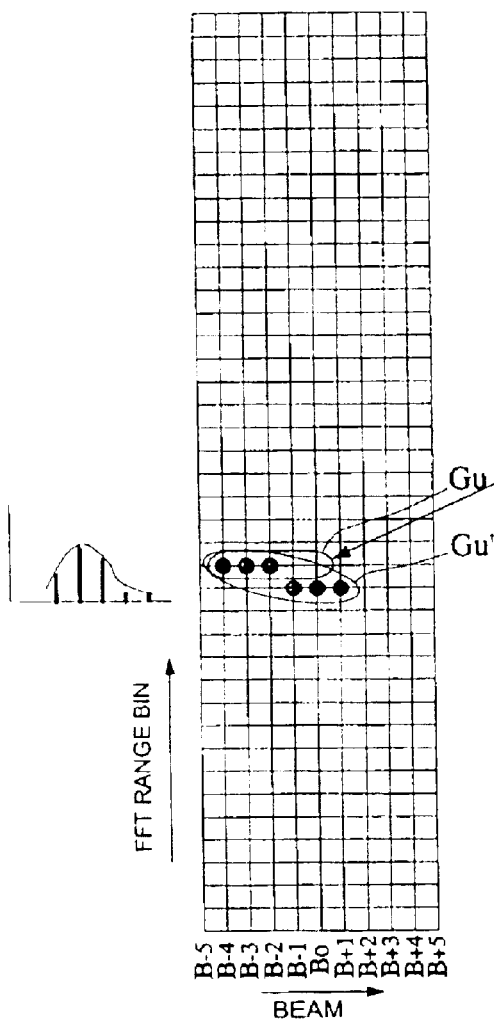
FIGS. 6A and 6B show a grouping method and extraction of a profile.
Figure 6B:
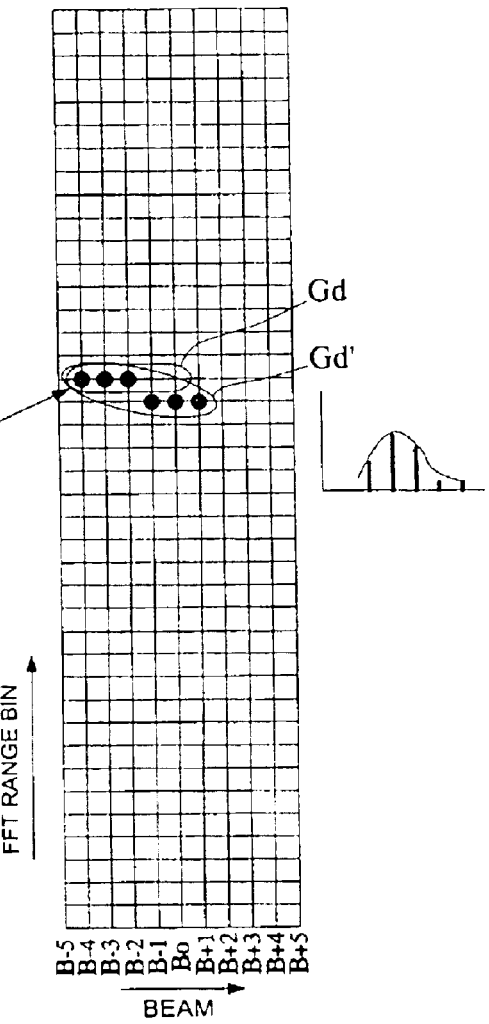

In the above-described example, peaks which are consecutive in the beam bearings at the same frequency are grouped. However, when the relative speed of the movable body is high, as shown in FIGS. 5A and 5B, the peak frequency shifts during the beam scanning. Therefore, peaks which are adjacent in the beam bearings are grouped within a predetermined frequency range. FIGS. 6A and 6B show an example of this situation. More specifically, in FIGS. 6A and 6B, Gu' and Gd' are groups defining a single target. With respect to these groups Gu' and Gd', representative beam bearings are determined. For example, the central bearing of the group is assumed to be a representative beam bearing, or the beam bearing of a peak having the highest signal intensity within the group is assumed to be a representative beam bearing. Then, regarding the frequency of the peak of that representative beam bearing, the signal intensities of the data for a plurality of beams (the number of items of this data will be described later) which are adjacent in the beam bearings with the representative beam bearing being the center are extracted as a profile. Gu and Gd in FIGS. 6A and 6B show an example of the range in which the signal intensities are extracted as a profile. In FIGS. 6A and 6B, the profiles of the groups Gu and Gd are also shown. The correlation level is determined for these groups Gu and Gd.

Figure 7A:
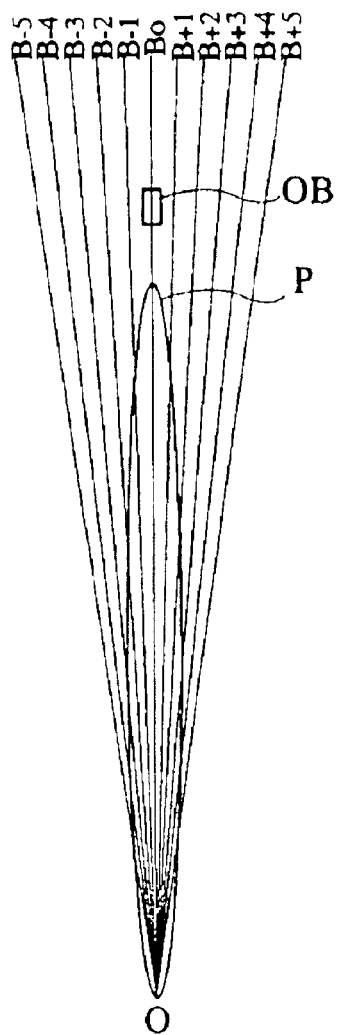
FIGS. 7A and 7B show the relationship between one beam width and beam spacing.
Figure 7B:
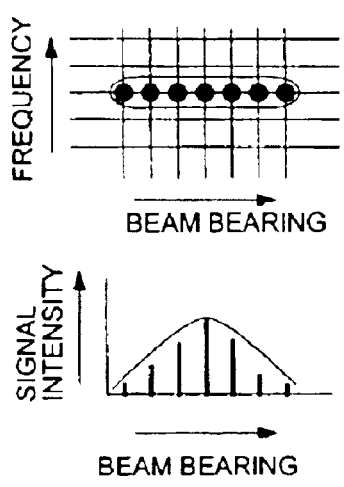

FIGS. 7A and 7B show how the number of items of data of the signal intensities of the peaks in the beam bearings, which should be extracted as the above-described signal-intensity profile, is determined to obtain the correlation level.

In FIG. 7A, a pattern indicated by "P" shows the transmission/receiving directional characteristics when the beam is directed to the Bo direction from the antenna position O. That is, in the central bearing Bo of the beam, the sensitivity is highest, and the sensitivity substantially decreases as the bearing deviates from to the right or left from the central bearing. For example, when scanning is performed with a beam of a beam width of about 3.5 degrees in increments of approximately 0.5 degree, a reception signal from one target is observed by approximately seven beams on the basis of 3.5/0.5=7. Therefore, where a target has a width in the beam bearing that is less than about 0.5 degrees, as shown in FIG. 7B, approximately seven peaks occur consecutively in the beam bearings. This means that one target is observed by seven beams. Based on this fact, even if beams of a number that is equal to or higher than seven, is used for the target having a narrow width in the beam bearings, that is, even if the correlation level is calculated by using a data sequence of seven or more items, an area which is not related to the target on which processing is to be performed will be included.

Therefore, a sequence of a total of seven items of signal-intensity data, in other words, a center item and three items on each side of the center item, is used as a profile. As a result, even when a target has a narrow width in the beam bearings, if profiles result from the same target, a high correlation level is obtained. As a result, the pairing accuracy is greatly improved.

Next, a description will be given of the setting of the number of items of data of a signal-intensity profile, which is extracted to determine the correlation level, in accordance with a distance to a target.

In the example shown in FIG. 3, targets OB1 to OB3 are vehicles having identical widths, but the number of beams which blocks the center of the beam differs depending on the distance from the vehicle. For example, the target OB1 blocks four centers of the beams, and the target OB3 blocks only two centers of the beams. In this manner, even if the widths of the targets are identical, as the distance to the target increases, the number of beams in which the center of the beam is blocked decreases. Therefore, as the distance to the target increases, by reducing the number of items of data of the signal intensities of the peaks in the beam bearings to be determined as a profile, it is possible to reliably extract, with regard to a target of any distance, a profile which spreads in a predetermined width in the beam bearings, resulting from the reflection-from the target. Consequently, in the case of a profile resulting from the same target, a high correlation level is obtained. As a result, the pairing accuracy is greatly improved.

In particular, in the radar installed in a vehicle, a main target to be observed is a vehicle, and the vehicle is considered as an aggregate of point-reflecting objects. Therefore, the profiles substantially match at the up-modulating interval and at the down-modulating interval. Thus, by using a profile defined by the number of items of data corresponding to the width of the vehicle, pairing with higher accuracy is possible.

For example, in a case where scanning with 41 beams is being performed within an area of approximately ±10 degrees in increments of approximately 0.5 degree, when a target having a vehicle width of 1.7 [m] is about 10 m away:

$\tan^{-1}(1.7 [m]/2/10 [m])*2/0.5 [degrees]=19.4$ [number of beams]≈19 [number of beams];

when the target is 30 m away, $\tan^{-1}(1.7 [m]/2/30 [m])*2/0.5 [degrees]=6.5$ [number of beams]≈7 [number of beams]; and when the target is 50 m away, $\tan^{-1}(1.7 [m]/2/50 [m])*2/0.5 [degrees]=3.8$ [number of beams]≈4 [number of beams] (when this needs to be an odd number, 3 [number of beams] or 5 [number of beams]).

However, at an increased distance, the number of beams corresponding to the width of one vehicle is decreased, and the accuracy of correlation level computation is decreased. Therefore, the methods shown in FIGS. 7A and 7B described above may be combined such that, in a comparatively short-distance area in which the vehicle's width is wider than the beam width, the number of beams of approximately the vehicle's width may be used, and in a comparatively long-distance area in which the vehicle's width is narrower than the beam width, the number of beams of approximately the beam width may be used.

Figure 8:
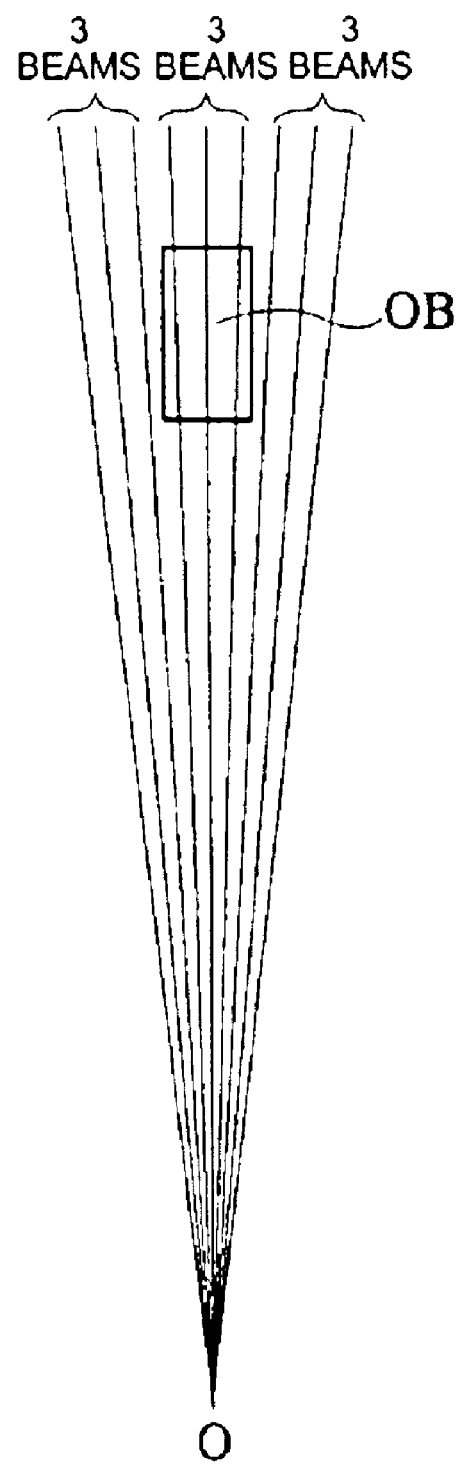
FIG. 8 shows the number of items of data of a profile to be determined in accordance with the distance to a target.

For example, as shown in FIGS. 7A and 7B, even if the width in the beam bearings is reduced, a plurality of peaks appear in the beam bearings so as to correspond to the beam width and the beam scanning interval. Therefore, as shown in FIG. 8, where the target blocks, for example, three centers of the beams, if three beams are added to the right and left of the beam contained in a single beam width, a sequence of data of nine signal intensities in the beam bearings is determined as a profile on the basis of 3+3+3=9.

In the manner described above, since the signal-intensity profile is determined as a sequence of a predetermined number of items of data with respect to a plurality of beams which are adjacent in the beam bearings, handling near the end of the beam scanning range becomes a problem. That is, an area occurs in which the number of items of data of the peak signal intensities in the beam bearings does not reach the number required to determine the correlation level. For example, when an area of approximately ±10 degrees is scanned for 41 beams at intervals of about 0.5 degrees in the beam bearings, the necessary number of items of data is obtained near approximately ±10 degrees.

Figure 9:
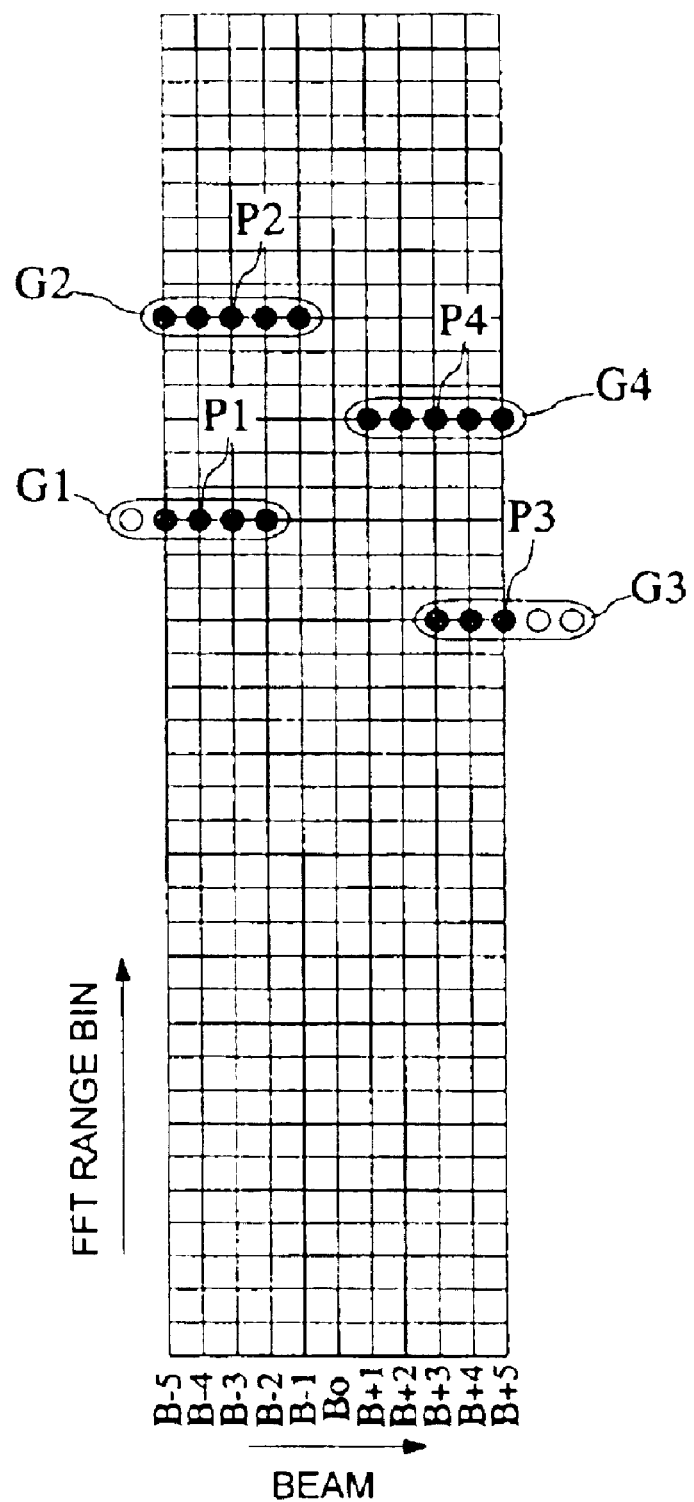
FIG. 9 shows handling of signal-intensity data at the ends of a beam scanning range.

In FIG. 9, for the portions indicated by G2 and G4, in this example, complete profiles are obtained for five items of data. However, for the portion indicated by G1, when a signal-intensity profile defined by a sequence of five items of data of a point indicated by P1 of the predetermined beam-bearing/predetermined frequency and those items of data on both sides of that point, only four items of data exist. Furthermore, for the portion indicated by G3, when a signal-intensity profile defined by a sequence of five items of data of a point indicated by P3 of the predetermined beam-bearing/predetermined frequency and those items of data on both sides of that point, only three items of data exist.

In such a case, the signal-intensity profile is determined from only the number of items of obtained data. Even for such a profile in which the number of items of data is insufficient, with a profile resulting from the same target, the profile is determined as a profile in which the number of items of data is the same at both the up-modulating interval and the down-modulating interval. Therefore, the correlation level between the profiles increases, and pairing is also possible for the target which exists in the end portion of the beam scanning range.

Figure 10:
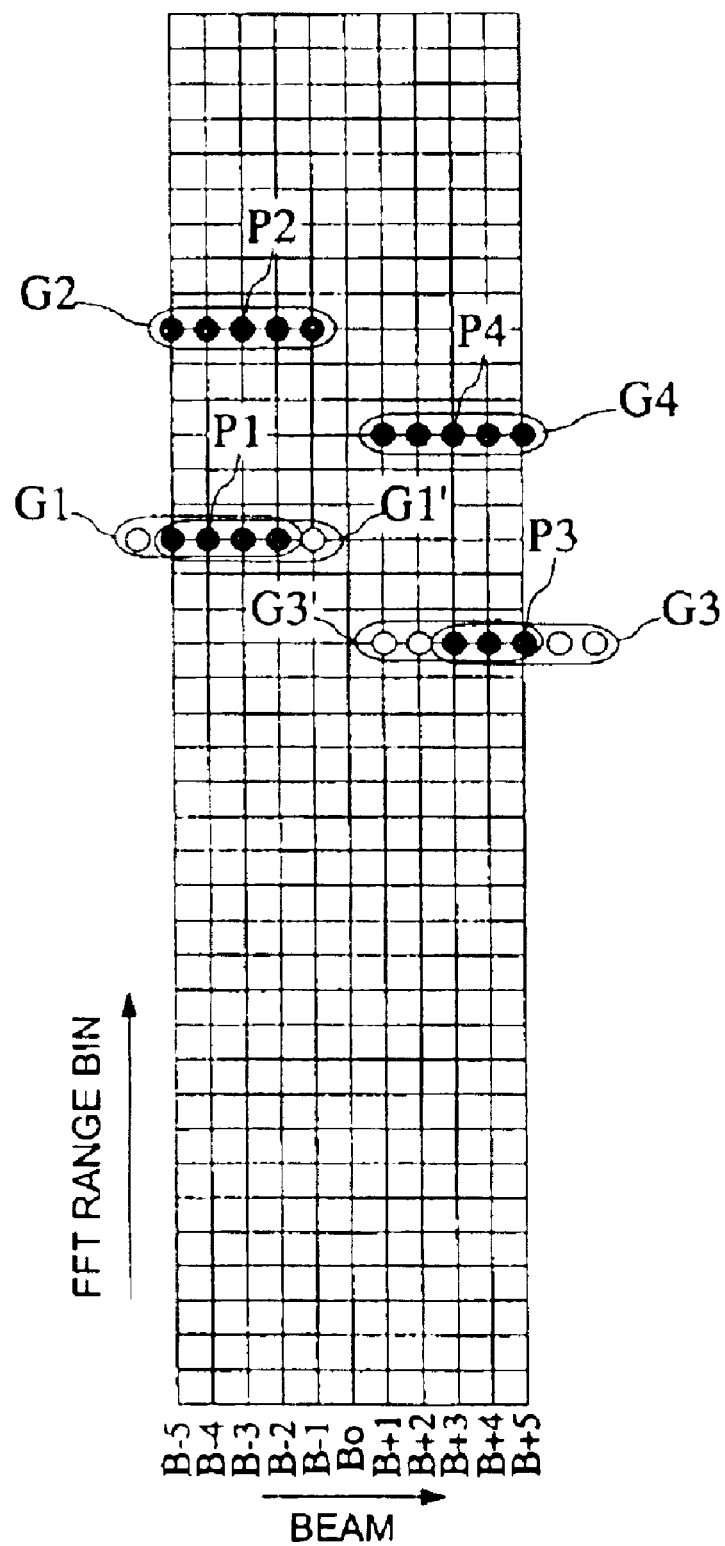
FIG. 10 shows another handling of signal-intensity data at the ends of a beam scanning range.

In the example shown in FIG. 10, with respect to G1, the data at the left-end portion of the five items of data is lost. However, to prevent this loss from occurring, a profile is determined for a range G1' in which the beams are shifted by one beam towards the center of the beam scanning range. Furthermore, in the portion indicated by G3, since two items of data on the right are lost, to prevent this loss from occurring, a profile is determined for a range G3' in which the beams are shifted by two beams towards the center of the beam scanning range.

Figure 11:
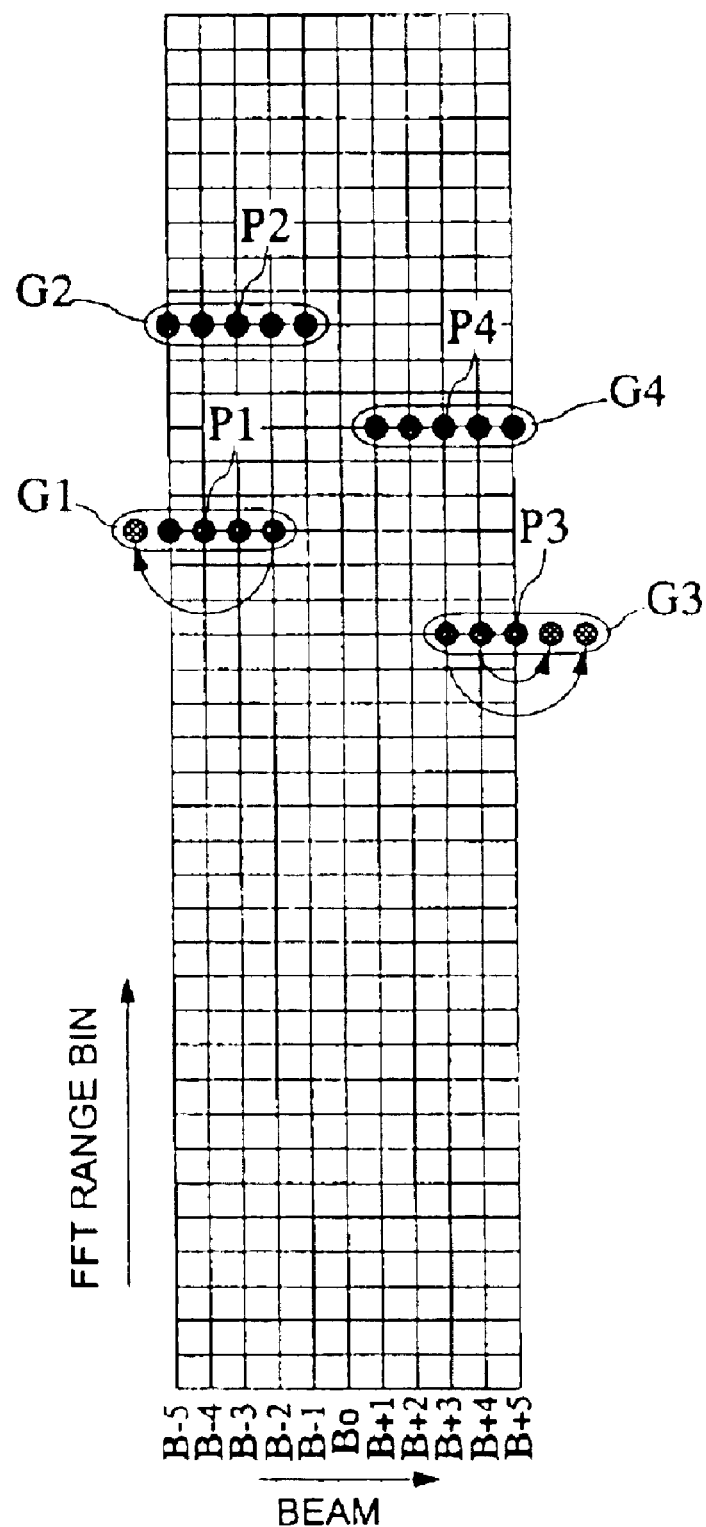
FIG. 11 shows another handling of signal-intensity data at the ends of a beam scanning range.

Furthermore, in the example shown in FIG. 11, with respect to G1, the data at the left-end portion of the five items of data is lost, but this data is supplemented with the data at the right-end portion. That is, the signal intensity of the data at the left end is made to be equal to the signal intensity of the data at the right end. Furthermore, in the portion indicated by G3, since two items of data at the right end are lost, the signal intensity at the right end is made to be substantially equal to the signal intensity at the left end, and the data which is second from the right end is made to be substantially equal to the data which is second from the left end.

In this manner, since the directional characteristics of the beam are substantially symmetrical about the center of the beam, the signal-intensity profile is also substantially symmetrical. Therefore, as described above, by supplementing the insufficient data with data at symmetrical positions in the manner described above, the accuracy of the supplemental data is improved, and the pairing accuracy is not substantially decreased.

The lost data may be supplemented with uniform data.

As described above, by supplementing the insufficient data, the correlation level is always determined with the same number of items of data. Therefore, the correlation computation/calculation method (algorithm) is commonly used, and the computation speed is greatly increased.

The correlation level is determined by being normalized as cross-correlation coefficients on the basis of the following equation.

$$\frac{1}{(n-1)s_{up}s_{down}} \sum_{i=1}^{n} (x_{upi} - \bar{x}_{up})(x_{downi} - \bar{x}_{down})$$

where $n$: the number of items of data (the number of beams for which correlation level is to be calculated), $s_{up}$: dispersion of signal intensities at the up-modulation interval, $s_{down}$: dispersion of signal intensities at the down-modulation interval, $x_{upi}$: i-th signal intensity at the up-modulation interval, $x_{downi}$: i-th signal intensity at the down-modulation interval, $\bar{x}_{up}$: average value of signal intensities at the up-modulation interval, and $\bar{x}_{down}$: average value of signal intensities at the down-modulation interval.

In this manner, a cross-correlation coefficient of about −1.0 to about 1.0 is determined. This value indicates the degree of matching of signal-intensity profiles spread in the beam bearings.

Figure 12:
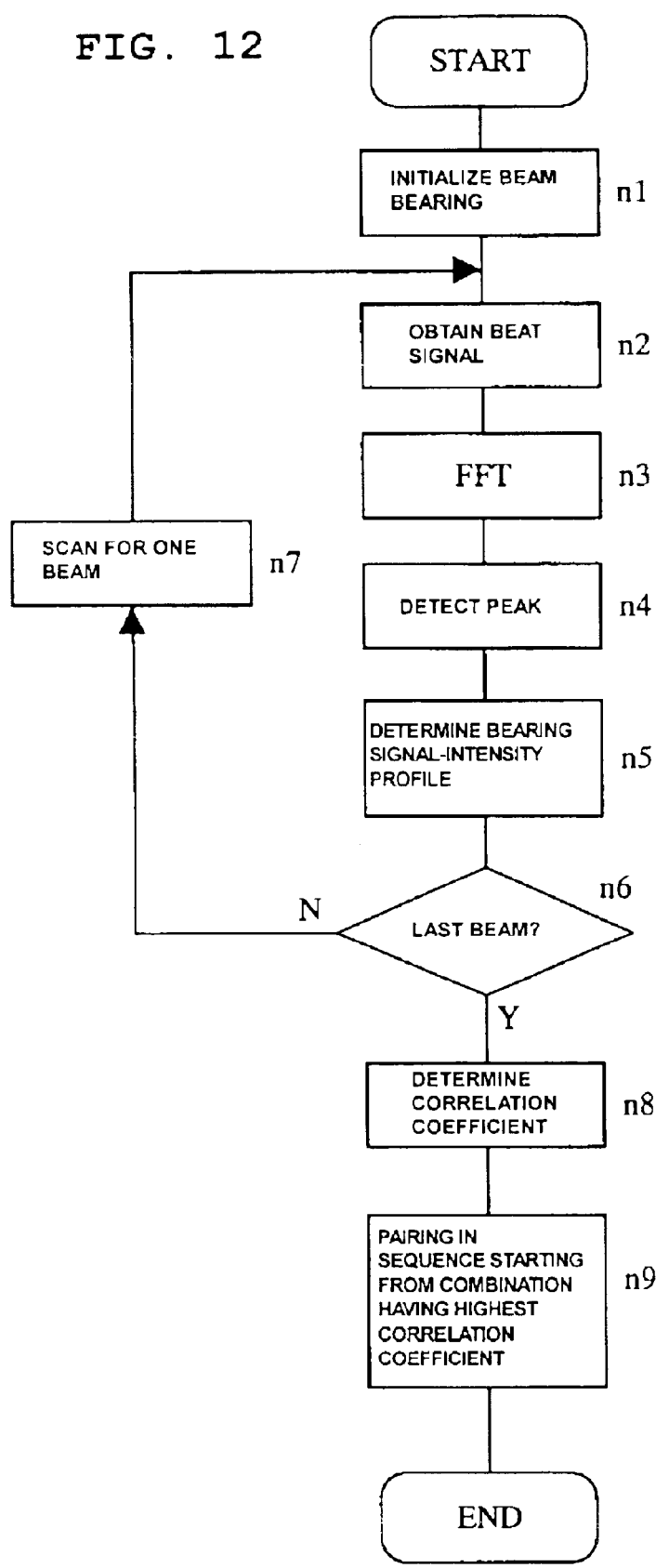
FIG. 12 is a flowchart showing a processing procedure of a radar control section.

The processing procedure, including the pairing described above, of the radar control section 2 shown in FIG. 1 is shown in the flowchart of FIG. 12. Initially, the motor (beam bearing) control section 22 controls the beam such that it is directed to an initial bearing (n1). In this state, items of beat-signal digital data generated by conversion by the AD converter 15 are obtained for a predetermined number of samplings, and FFT processing is performed thereon (n2→n3). Then, a peak is detected (n4). Specifically, a portion at which the signal intensity of the frequency spectrum peaks in a pointed shape is detected, and the signal intensity at that peak frequency is extracted.

If a peak exists, at the peak frequencies, a signal-intensity profile is determined for the number of items of data of a predetermined width in the beam bearings at that peak frequency (n5).

After that, the beam bearing is shifted by one beam, and the same processes are repeated (n6→n7→n2→ . . . ).

By repeatedly performing the above processing up to the last beam, for a scanning range spreading in a predetermined width in the bearing, a signal-intensity profile of each peak is determined.

Then, the cross-correlation coefficient of the profiles with the peak frequency in the same beam bearing being the center, determined for each of the up-modulating interval and the down-modulating interval, is determined (n8).

Thereafter, pairing is performed in sequence starting from the combination of the profiles in which the cross-correlation coefficient is highest (n9). That is, the central bearing of the profiles which define a pair is determined as the bearing of the target, and a relative distance to the target and a relative speed to the target are determined based on the upbeat frequency and the downbeat frequency.

Figure 13:
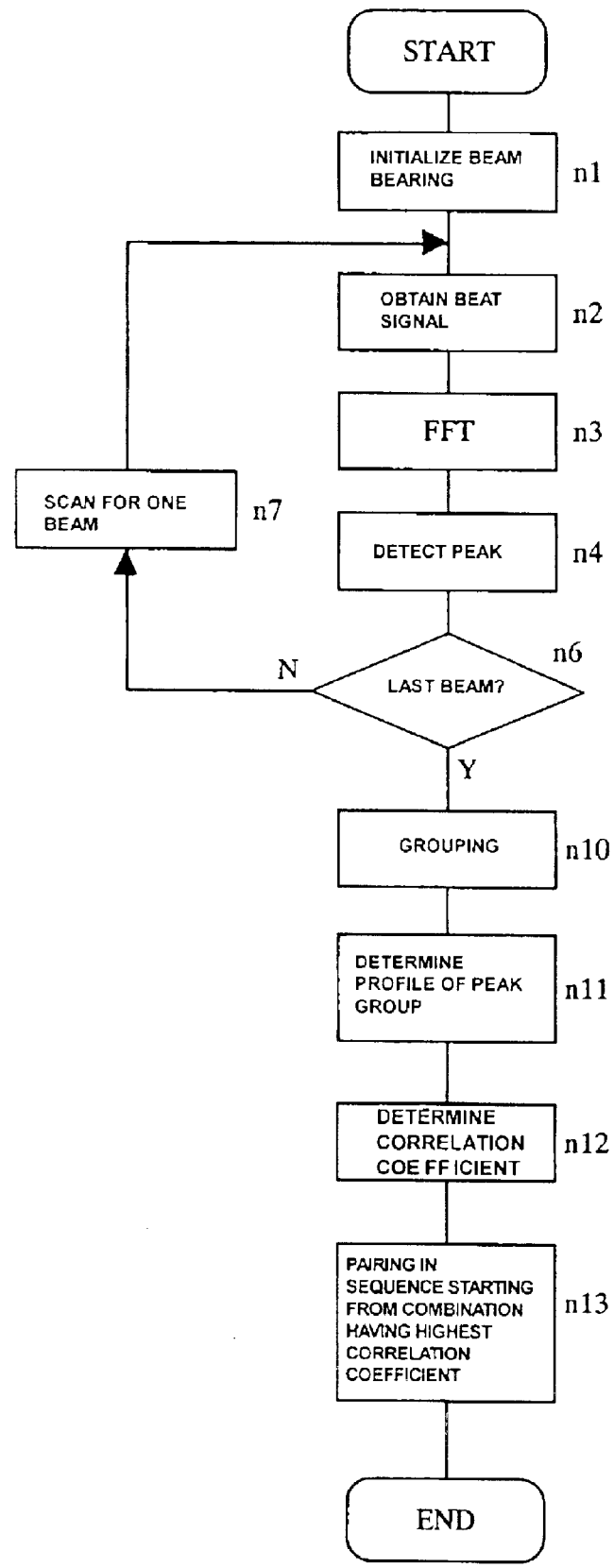
FIG. 13 is another flowchart showing a processing procedure of a radar control section.

Next, the processing procedure of the radar control section 2, including grouping, is shown in the flowchart of FIG. 13. The processes of steps n1 to n4, and n7 are the same as those steps shown in FIG. 12. That is, in these steps n1 to n4, and n7, the peak frequency of the peak is determined for each beam bearing.

Thereafter, a range in which the peaks are consecutive in the beam bearings are extracted as one peak group, and a profile is extracted for the peak group (n10→n11).

Then, the cross-correlation coefficient of the profiles at the up-modulating interval and the profile at the down-modulating interval is determined (n12).

Thereafter, pairing is performed in sequence starting from the combination of the profiles in which the cross-correlation coefficient becomes highest (n13). That is, the central bearing of the profiles which define a pair is determined as the bearing of the target, and a relative distance to the target and a relative speed to the target are determined based on the upbeat frequency and the downbeat frequency. The bearing of the target is determined from the representative beam bearing of each group.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A radar comprising:

a transmitting/receiving unit for transmitting a transmitting signal such that an up-modulating interval, in which a frequency gradually increases, changes repeatedly and a down-modulating interval in which a frequency gradually decreases, changes repeatedly, and for receiving a reception signal including a reflected signal from a target;

a scanning unit for varying a beam bearing of said transmitting signal for a predetermined scanning range;

a frequency-analyzing unit for obtaining data on a frequency spectrum of a beat signal of said transmitting signal and said reception signal;

a detecting unit for detecting at least one of a relative distance to said target and a relative speed to said target on the basis of a peak frequency which appears in a frequency spectrum at said up-modulating interval and a peak frequency which appears in a frequency spectrum at said down-modulating interval; and a pairing unit which determines a peak frequency of a peak which appears in said frequency spectrum with regard to each of said up-modulating interval and said down-modulating interval in said beam bearing, which extracts a signal-intensity profile at a frequency that is substantially equal to the peak frequency with regard to a plurality of beams which are adjacent to said predetermined beam bearing, which determines correlation levels between profiles at said up-modulating interval and said down-modulating interval, and which selects a combination of said profiles having the highest correlation level.

2. A radar according to claim 1, further comprising an extracting unit for extracting a peak group in which said peaks are consecutive in beam bearings wherein said signal-intensity profile is extracted with regard to said peak group.

3. A radar according to claim 1, wherein the number of items of data of signal intensities of said peaks in said beam bearings for which said correlation level is to be calculated, is approximately equal to the number of beams covered in a single beam width.

4. A radar according to claim 1, wherein the number of items of data of signal intensities of said peaks in said beam bearings, for which said correlation level is to be calculated, is decreased as the distance to said target increases.

5. A radar according to claim 1, wherein said correlation level is a normalized correlation coefficient.

6. A radar according to claim 1, wherein, when, near the end of said scanning range, the number of items of data of said signal intensities of said peaks in said beam bearings does not reach a number required to determine said correlation level, said correlation level is determined by ignoring insufficient data.

7. A radar according to claim 1, wherein, when, near an end of said scanning range, the number of items of data of said signal intensities of said peaks in said beam bearings does not reach a number required to determine said correlation level, said correlation level is determined by supplementing insufficient data with predetermined data.

8. A radar according to claim 7, wherein, said predetermined data is defined by normalized data.

9. A radar according to claim 7, wherein said predetermined data is defined by signal intensities from the other end of said scanning range.

10. A radar comprising:

a transmitting/receiving unit for transmitting a transmitting signal such that an up-modulating interval in which a frequency gradually increases, changes repeatedly and a down-modulating interval, in which a frequency gradually decreases, changes repeatedly, and for receiving a reception signal including a reflected signal from a target;

a scanning unit for varying a beam bearing of said transmitting signal for a predetermined scanning range;

a frequency-analyzing unit for obtaining data on a frequency spectrum of a beat signal of said transmitting signal and said reception signal;

a detecting unit for detecting at least one of a relative distance to said target and a relative speed to said target on the basis of a peak frequency which appears in a frequency spectrum at said up-modulating interval and a peak frequency which appears in a frequency spectrum at said down-modulating interval; and a pairing unit which determines correlation levels between profiles at said up-modulating interval and said down-modulating interval, and which selects a combination of said profiles having the highest correlation level.

11. A radar according to claim 10, wherein said pairing unit determines a peak frequency of a peak which appears in said frequency spectrum with regard to each of said up-modulating interval and said down-modulating interval in said beam bearing, and extracts a signal-intensity profile at a frequency that is substantially equal to the peak frequency with regard to a plurality of beams which are adjacent to said predetermined beam bearing.

12. A radar according to claim 11, further comprising an extracting unit for extracting a peak group in which said peaks are consecutive in beam bearings, wherein said signal-intensity profile is extracted with regard to said peak group.

13. A radar according to claim 11, wherein the number of items of data of signal intensities of said peaks in said beam bearings, for which said correlation level is to be calculated, is approximately equal to the number of beams covered in a single beam width.

14. A radar according to claim 11, wherein the number of items of data of signal intensities of said peaks in said beam bearings, for which said correlation level is to be calculated, is decreased as the distance to said target increases.

15. A radar according to claim 10, wherein said correlation level is a normalized correlation coefficient.

16. A radar according to claim 10, wherein, when, near the end of said scanning range, the number of items of data of said signal intensities of said peaks in said beam bearings does not reach a number required to determine said correlation level, said correlation level is determined by ignoring insufficient data.

17. A radar according to claim 10, wherein, when, near an end of said scanning range, the number of items of data of said signal intensities of said peaks in said beam bearings does not reach a number required to determine said correlation level, said correlation level is determined by supplementing insufficient data with predetermined data.

18. A radar according to claim 17, wherein, said predetermined data is defined by normalized data.

19. A radar according to claim 17, wherein said predetermined data is defined by signal intensities from the other end of said scanning range.

* * * * *